United States Patent
Uezaki et al.

(10) Patent No.: US 7,127,917 B2
(45) Date of Patent: Oct. 31, 2006

(54) METHOD OF MANUFACTURING MOLDED GLASS OBJECTS, METHOD OF MANUFACTURING PRESS MOLDED ARTICLES, AND METHOD OF MANUFACTURING GLASS OPTICAL ELEMENTS

(75) Inventors: Atsushi Uezaki, Oume (JP); Katsumi Utsugi, Tachikawa (JP)

(73) Assignee: Hoya Corporation, Tokyo (JP)

( * ) Notice: Subject to any disclaimer, the term of this patent is extended or adjusted under 35 U.S.C. 154(b) by 316 days.

(21) Appl. No.: 10/247,288

(22) Filed: Sep. 20, 2002

(65) Prior Publication Data

US 2003/0051508 A1 Mar. 20, 2003

(30) Foreign Application Priority Data

Sep. 20, 2001 (JP) .............................. 2001-286274

(51) Int. Cl.
*C03B 19/00* (2006.01)
*C03B 9/13* (2006.01)
(52) U.S. Cl. .............................. 65/66; 65/122; 65/127; 65/72; 65/207; 65/208; 65/303
(58) Field of Classification Search ................ 65/21.5, 65/25.1, 66, 68, 72–76, 122–123, 126, 127, 65/129, 130, 207, 208, 303, 312
See application file for complete search history.

(56) References Cited

U.S. PATENT DOCUMENTS

| 3,162,522 | A | * | 12/1964 | Tingley | ................... | 65/225 |
| 3,981,711 | A | * | 9/1976 | Bjorkstrom | ................... | 65/165 |
| 5,762,673 | A | * | 6/1998 | Hirota et al. | ................... | 65/25.1 |
| 6,595,026 | B1 | * | 7/2003 | Tsukada | ................... | 65/24 |
| 2004/0261454 | A1 | * | 12/2004 | Yoshida et al. | ................... | 65/21.3 |

FOREIGN PATENT DOCUMENTS

| JP | 63315524 | A | * | 12/1988 |
| JP | 02267125 | A | * | 10/1990 |
| JP | 05147949 | A | * | 6/1993 |
| JP | 08277132 | A | * | 10/1996 |
| JP | 09040431 | A | * | 2/1997 |
| JP | 2001192214 | A | * | 7/2001 |

OTHER PUBLICATIONS

Machine Translation of JP 05-147949 retrieved from http://www19.ipdl.ncipi.go.jp/PA1/cgi-bin/PA1INIT?1102431898753 on Apr. 28, 2005.*

Machine translation of JP 2001-192214 retrieved from http://www19.ipdl.ncipi.go.jp/PA1/cgi-bin/PA1INIT?1102431898753 on Apr. 28, 2005.*

* cited by examiner

*Primary Examiner*—Carlos Lopez
(74) *Attorney, Agent, or Firm*—Sughrue Mion, PLLC

(57) ABSTRACT

Disclosed is a method for manufacturing a molded glass object. In the method, glass melt is made to flow from the front end portion of a nozzle; a prescribed weight of the glass melt flowing out is received by a glass melt receiving portion provided on a forming mold moved beneath the nozzle, wherein multiple forming molds are sequentially moved beneath the nozzle; the glass melt gob received is moved from the glass melt receiving portion to a hollow provided on the forming mold; and in the hollow, a molded glass object is formed while blowing gas upward through a gas outlet provided in the bottom of the hollow. The method is characterized in that the front end of the nozzle is constantly positioned outside the space vertically above the gas outlet. Methods of manufacturing press molded articles of glass and optical glass elements are described.

13 Claims, 4 Drawing Sheets

METHOD OF MANUFACTURING MOLDED GLASS OBJECTS, METHOD OF MANUFACTURING PRESS MOLDED ARTICLES, AND METHOD OF MANUFACTURING GLASS OPTICAL ELEMENTS

TECHNICAL FIELD

The present invention relates to a method of, and device for, manufacturing molded glass objects such as preforms for press molding out of glass melt, as well as a method of manufacturing a shaped glass article such as an optical element by heating and softening a glass preform.

BACKGROUND ART

Methods of receiving in a forming mold a prescribed quantity of glass melt continuously flowing out of a nozzle, forming it into a sphere or similar shape, and employing the glass object obtained as a preform in the forming of molded optics or the like are known. Good preforms are manufactured not with a cutting blade, which causes the glass received in the forming mold to retain traces that could become defects in the press formed article, but by using the constriction produced in the flowing glass when the quantity of glass flowing out has reached a certain quantity to naturally sever the glass. The examples of Japanese Unexamined Patent Publication (KOKAI) Heisei No. 5-147949 (the Publication) describe such a method.

In the method disclosed in the Publication, the front end portion of the glass melt is received by the rim portion of the forming mold, and when the weight of the front end portion reaches a prescribed level, the constriction portion is used to separate the front end portion and slide it into the forming mold, with gas blown upward through gas outlets in the bottom of the forming mold being used to float the glass melt and form it into a sphere.

In the molding of preforms described in the Publication, numerous preforms are molded by a method in which forming molds are positioned at equal intervals about the rotational axis of a turntable undergoing indexed rotation, continuously flowing glass melt is received by successive forming molds and shaped, the shaped preforms are removed from the forming molds, and glass melt is received anew in the emptied forming molds.

The problem lies in that when the forming molds are moved, the gas blown upward from the forming molds sticks to the nozzle, with the nozzle and the glass flowing out of the nozzle ending up cooling. In the method of the Publication, this problem does not occur during receiving of the glass melt (referred to as casting) because the nozzle is not directly above the gas outlet of the forming mold. However, the gas being blown out of the gas outlets ends up being blown onto the nozzle when the forming mold is moved into the casting position and when the forming mold is moved out of the casting position.

In the forming of preforms, particularly in precision press forming such as the forming of molded optics, it is necessary to precisely control the weight of the preform and mold preforms without defects such as devitrification or striae. Viewed from this perspective, the blowing of the gas onto the nozzle even briefly is a substantial practical problem in that it results in a change of viscosity in the glass melt, thereby affecting the flow rate.

Accordingly, the present invention aims to solve the problem of gas from the gas outlet blowing onto the nozzle and changing the flow rate by altering the viscosity of the glass melt when the forming mold is moved into or out of casting position. The object of the present invention is to provide a method and device of manufacturing glass preforms with little variation in weight, and a method of employing the molded glass objects produced by this method as preforms in press molding to manufacture molded glass articles.

SUMMARY OF THE INVENTION

The present invention relates to a method of manufacturing a molded glass object in which glass melt is made to flow from the front end portion of a nozzle, a prescribed weight of the glass melt flowing out is received by a glass melt receiving portion provided on a forming mold moved beneath the nozzle, wherein multiple forming molds are sequentially moved beneath the nozzle, the glass melt gob received is moved from the glass melt receiving portion to a hollow provided on said forming mold, and in the hollow, a molded glass object is formed while blowing gas upward through a gas outlet provided in the bottom of the hollow, characterized in that the front end of said nozzle is constantly positioned outside the space vertically above said gas outlet.

In the above method of manufacturing a molded glass object according to the present invention, it is preferable that the nozzle comprises a front end portion and a main body with a diameter larger than said front end portion, and said main body is also constantly positioned outside the space vertically above said gas outlet.

In the above method of manufacturing a molded glass object according to the present invention, it is also preferable that the multiple forming molds are positioned along the perimeter centered about the rotational axis of said turntable, said forming molds are displaced by rotating said turntable in an indexed fashion, and the distance from the rotational axis to a point directly below the front end portion of the nozzle is set to be either greater than or less than the distance from said rotational axis to the planar center of said forming mold, thereby constantly maintaining the end portion of the nozzle at a position outside the space vertically above said gas outlet.

In the above method of manufacturing a molded glass object according to the present invention, it is further preferable that the glass melt receiving portion is an inclined portion positioned between the upper surface and hollow of said forming mold, and the glass melt gob received on said inclined portion slides into said hollow of its own weight.

The present invention further relates to a method of manufacturing press molded articles of glass characterized in that a molded glass object manufactured by the method according to the present invention is heated, softened, and press molded.

The present invention still further relates to a method of manufacturing optical glass elements characterized in that a molded glass object manufactured by the method according to the present invention is heated, softened, and precision press molded.

The present invention further relates to a device for manufacturing molded glass objects in which glass melt is molded into molded glass objects, comprising: a nozzle through which flows a glass melt; multiple forming molds, each having a hollow in the bottom of which is formed a gas outlet, that shape the glass melt flowing out through the nozzle into molded glass objects; a means of feeding gas to the gas outlets in the forming molds; a turntable about the rotational axis of which are positioned the multiple forming molds; and a means of causing the turntable to undergo indexed rotation about the rotational axis and sequentially move the forming molds beneath the nozzle; characterized in that said nozzle is positioned so that the distance from the rotational axis to a point directly below the front end portion of the nozzle is either greater than or less than the distance from said rotational axis to the planar center of said forming mold, thereby constantly maintaining the end portion of the nozzle at a position outside the space vertically above said gas outlet.

DETAILED DESCRIPTION OF THE PREFERRED EMBODIMENTS

The present invention will be described below.

Figure 1:
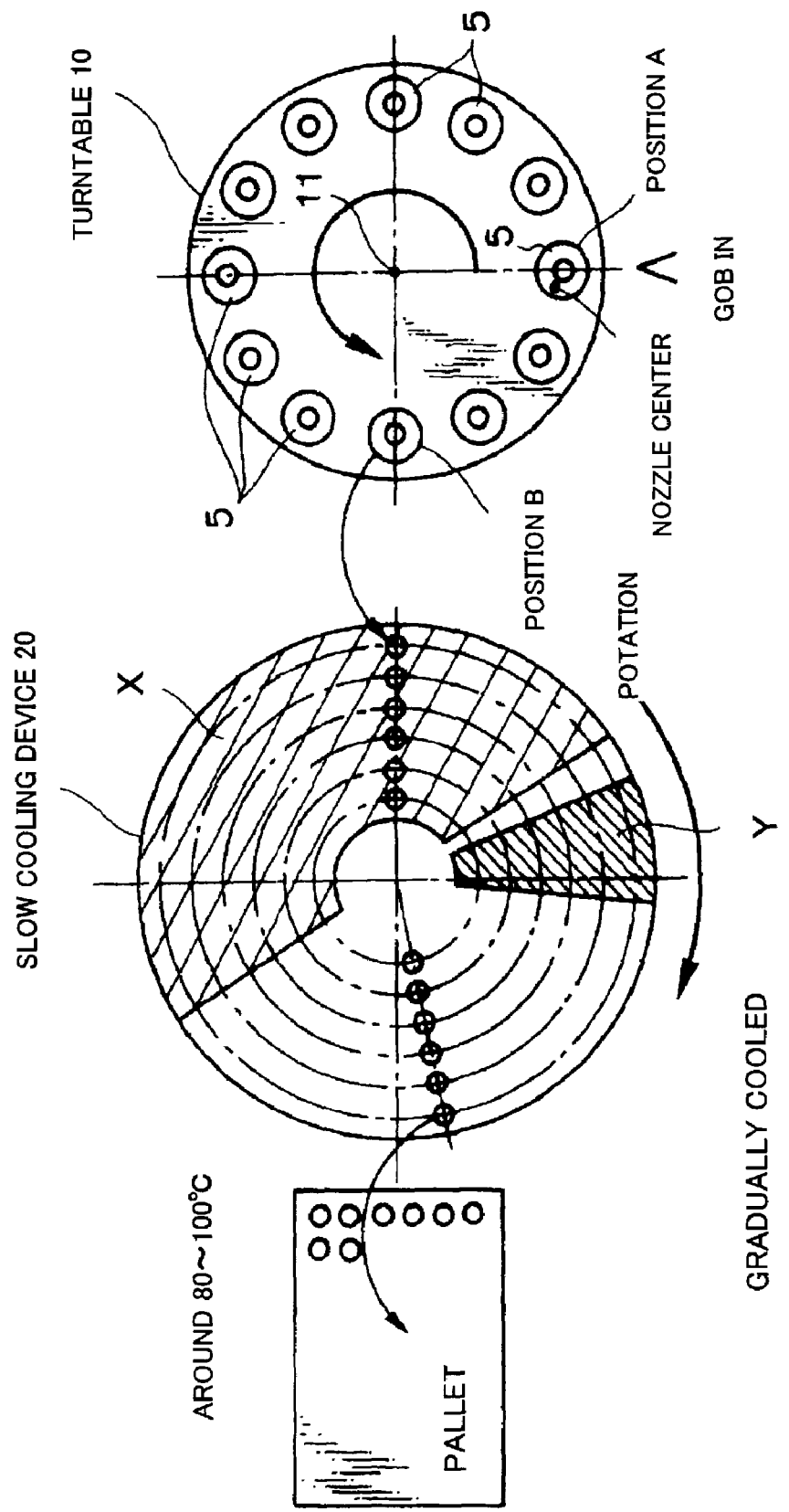
FIG. 1 is plan view schematic of an example of the molded glass object manufacturing device of the present invention.

FIG. 1 is a plan view schematic of an example of the molded glass object manufacturing device of the present invention. This device is used in the course of forming preforms out of glass melt, primarily for use in press molding. The preforms obtained are heated and softened, and then pressed by the press forming mold to obtain molded glass articles such as lenses. Accordingly, the preforms must be shaped to a certain weight and a certain size (for example, the diameter in the case of spherical preforms, and the outer diameter in the case of marble-shaped preforms) permitting them to be set in press forming molds.

The practice of the method of manufacturing molded glass objects of the present invention with the device for manufacturing molded glass objects of the present invention will be described.

The device for manufacturing molded glass objects of the present invention is equipped with: a nozzle through which flows a glass melt; multiple forming molds, each having a hollow in the bottom of which is formed a gas outlet, that shape the glass melt flowing out through the nozzle into molded glass objects; a means of feeding gas to the gas outlets in the forming molds; a turntable about the rotational axis of which are positioned the multiple forming molds; and a means of causing the turntable to undergo indexed rotation about the rotational axis and sequentially move the forming molds beneath the nozzle.

The device is shown in FIG. 1. In FIG. 1, there are twelve forming molds 5, for forming glass melt on the turntable 10, positioned at equal intervals around a perimeter centered about the rotational axis 11 of turntable 10. The twelve forming molds 5 are simultaneously moved and stopped as turntable 10 is rotated in an indexed fashion so as to stop at prescribed stopping points. The direction of the rotation of the turntable is counterclockwise in FIG. 1. A nozzle through which continuously flows melt glass at a constant flow rate is positioned above forming mold 5 at position A, marked "Gob in". Only the center position of the nozzle is shown in FIG. 1. Melt glass flowing out through the the center position of the nozzle is shown in FIG. 1. Melt glass flowing out through the nozzle is received by a nozzle 1 stopped at position A, and while being formed into a glass gob of a prescribed shape, removed from forming mold 5 at point B and moved to slow cooling plate 20.

Slow cooling plate 20 is a table of disk-shaped carbon or fire-resistant material, on the surface of which depressions for stably carrying the formed glass gobs are provided at multiple spots in radial and concentric fashion. In the figure, slow cooling plate 20 slowly turns to the right (clockwise). Area X in the figure is heated by a heater from the back and is regulated to a temperature at which the hot glass gobs are not damaged by thermal shock when loaded immediately following forming. This simple slow cooling on a slow cooling plate is suited to the slow cooling of preformed glass objects, such as the preforms employed in precision glass molding, which are molded in a reheated, softened state without undergoing a cold processing step (a step such as cutting, grinding, or polishing) following cooling. At area Y in FIG. 1, cooling is promoted by blowing a gas such as air onto the glass gobs from above so that the temperature of the glass gobs is about 80 to 100° C. at the point where they are transferred to a pallet. In this manner, a large number of glass gobs can be efficiently and gradually cooled in a limited space.

When cold processing glass gobs, residual deformation is excessive in such simple slow cooling and the glass gobs end up being damaged during processing. When employing glass gobs as preforms in precision press molding, there is no problem of excessive residual deformation of the glass gobs because they are pressed in a softened state. For the level of deformation reduction required in optical articles, it suffices to conduct annealing following precision press molding in addition to adjusting optical characteristics.

Glass gobs are not shown in FIG. 1. The glass gobs may be removed from forming mold 5 by using suction to hold them during removal, blowing them along with gas, or some other known method.

Figure 2:
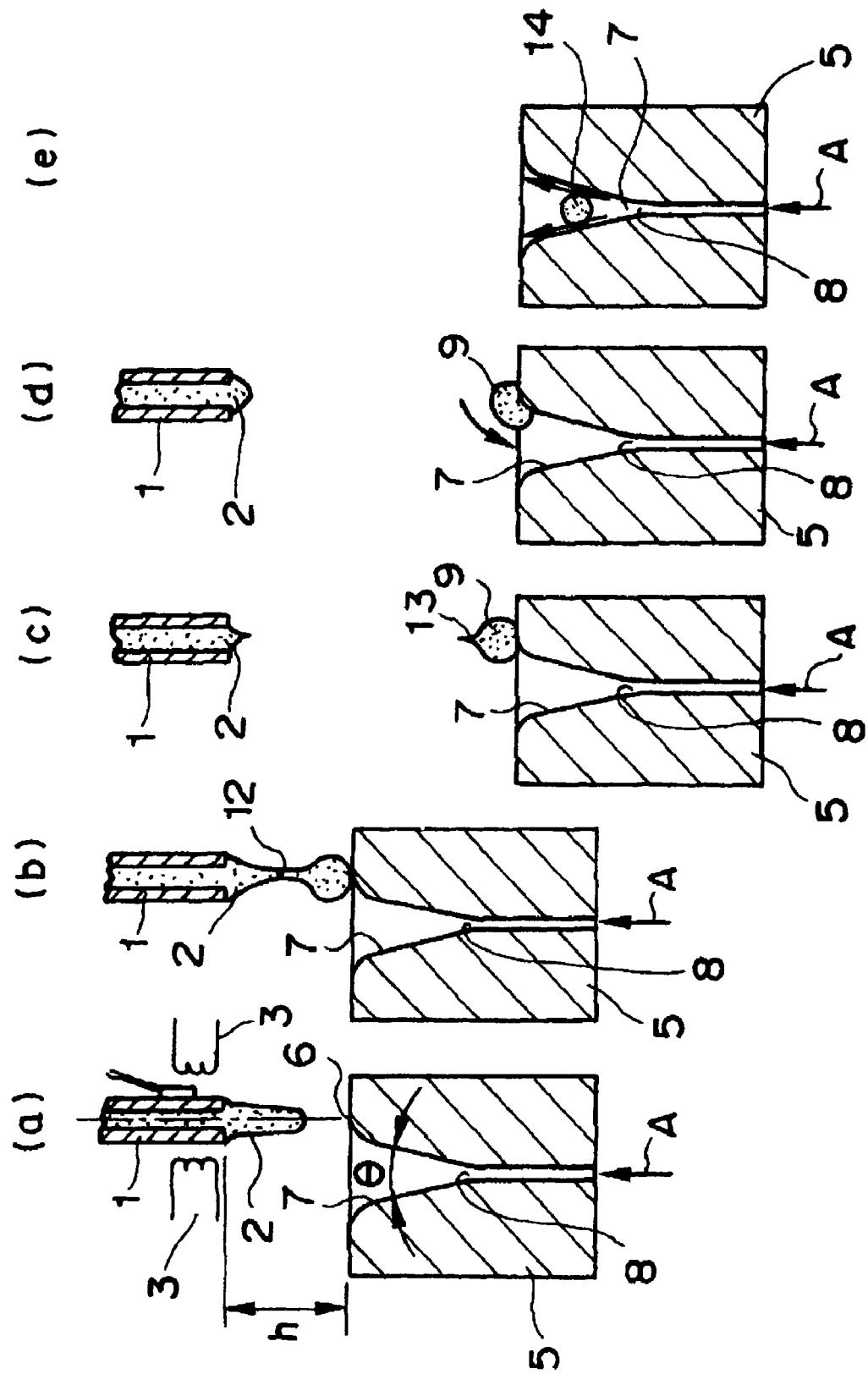
FIG. 2 is a model diagram of the method of shaping a glass melt flowing out of a nozzle in a forming mold.

FIG. 2 is a model drawing providing a horizontal view of how the glass melt 2 flowing from nozzle 1 is shaped in forming mold 5. Glass melt 2 flows from the front end of platinum alloy nozzle 1, as shown in FIG. 2(a). The temperature is monitored by a thermocouple 4 positioned inside the nozzle with feedback to heater 3 to render the flow speed constant. Such control produces a viscosity in the glass melt passing through the nozzle that renders the flow speed constant.

At stopping position A, forming mold 5 is positioned beneath nozzle 1, and the front end of the glass melt flow 2 flowing through nozzle 1 is received as shown in FIGS. 2(a) and (b). At this time, forming mold 5 is raised to a height greater than that at the other stopping positions to receive the front end of the glass melt flow. Forming mold 5 is equipped at the bottom thereof with a trumpet-shaped hollow 7 in which a gas outlet 8 is provided, with hollow 7 having an outer rim portion 6. The function of outer rim portion 6 is to receive the glass melt as it flows out. The inclined surface between outer rim portion 6 and gas outlet 8 of hollow 7 is a forming surface for shaping the glass melt. When the front end of glass melt flow 2 reaches the outer rim portion 6 of forming mold 5, a constriction 12 forms in glass melt flow 2. At that time, the lower end of nozzle 1 and the upper end of forming mold 5 are pulled apart rapidly relative to the flow speed of the glass melt flow. (This operation of rapidly increasing the difference in height h between the lower end of nozzle 1 and the upper end of forming mold 5 is called "dropping"). Dropping separates glass 9 below constriction 12 from glass melt flow 2 without using a cutting blade. The point of separation 13 is incorporated into glass 9 with no trace remaining. The weight of glass 9 that is received in forming mold 5 is controlled by suitably adjusting the flow speed of the glass melt, the timing of dropping, height h, and the like. As shown in FIG. 2(*d*), the separated glass 9 slides from outer rim portion 6 into hollow 7. At that time, pure nitrogen gas, air, or an inert gas is blown upward through gas outlet 8.

The temperature of the gas fed through gas outlet 8 is adjusted with attention to the following points. First, the temperature is set so that the blown gas does not heat the forming mold and weld the glass melt to hollow 7 of the forming mold. Thus, the temperature of the blown gas is desirably set to less than or equal to 300° C. The temperature of the gas is desirably adjusted to within a range of from −50 to 300° C. by means of the properties of the glass being molded and the weight of the preform. Since the temperature of the blown gas is thus significantly lower than the temperature of nozzle 1 (for example, 100° C.), when the gas is blown onto the nozzle, the nozzle temperature decreases, and in particular, the temperature of the glass melt flowing from the front end of the nozzle ends up decreasing. However, in the manufacturing method of the present invention, since the front end of the nozzle is constantly (that is, while the glass melt flowing out is being received by the receiving portion and while the forming mold is being moved) positioned to the outside of the space vertically above the gas outlet, a decrease in nozzle temperature is prevented.

Since the forming molds are used in a circulating manner, a mechanism for cooling the forming molds may be provided to prevent an increase in the temperature of the forming molds due to heat transmitted from the glass.

The flow rate of the blown gas is set to a level adequate to form a sphere while rotating the glass gob within the hollow. The forming surface of hollow 7 of forming mold 5 and the outer rim portion 6 are mirror finished. The steps of FIGS. 2(*a*) to (*d*) are conducted at stopping position A. The softened glass gob is formed into a spherical glass gob 14 while being rotated by blown gas as shown in FIG. 2(*e*) in forming mold 5 after it has been moved from stopping position A. Twelve forming molds 5 are employed in a circulating manner to repeatedly perform the above-described sequence of steps, thereby forming spherical glass gobs 14 (preforms, for example) from the glass melt.

The method of separating glass by the dropping operation shown in FIG. 2 is advantageous relative to the method of dripping glass melt from the nozzle in that it permits the production of heavy preforms. Further, since glass melt is first received on a receiving portion in the form of the outer rim portion 6, it is possible to prevent the clogging of gas outlet 8, in contrast to what happens when glass is abruptly placed into the hollow.

Figure 3:
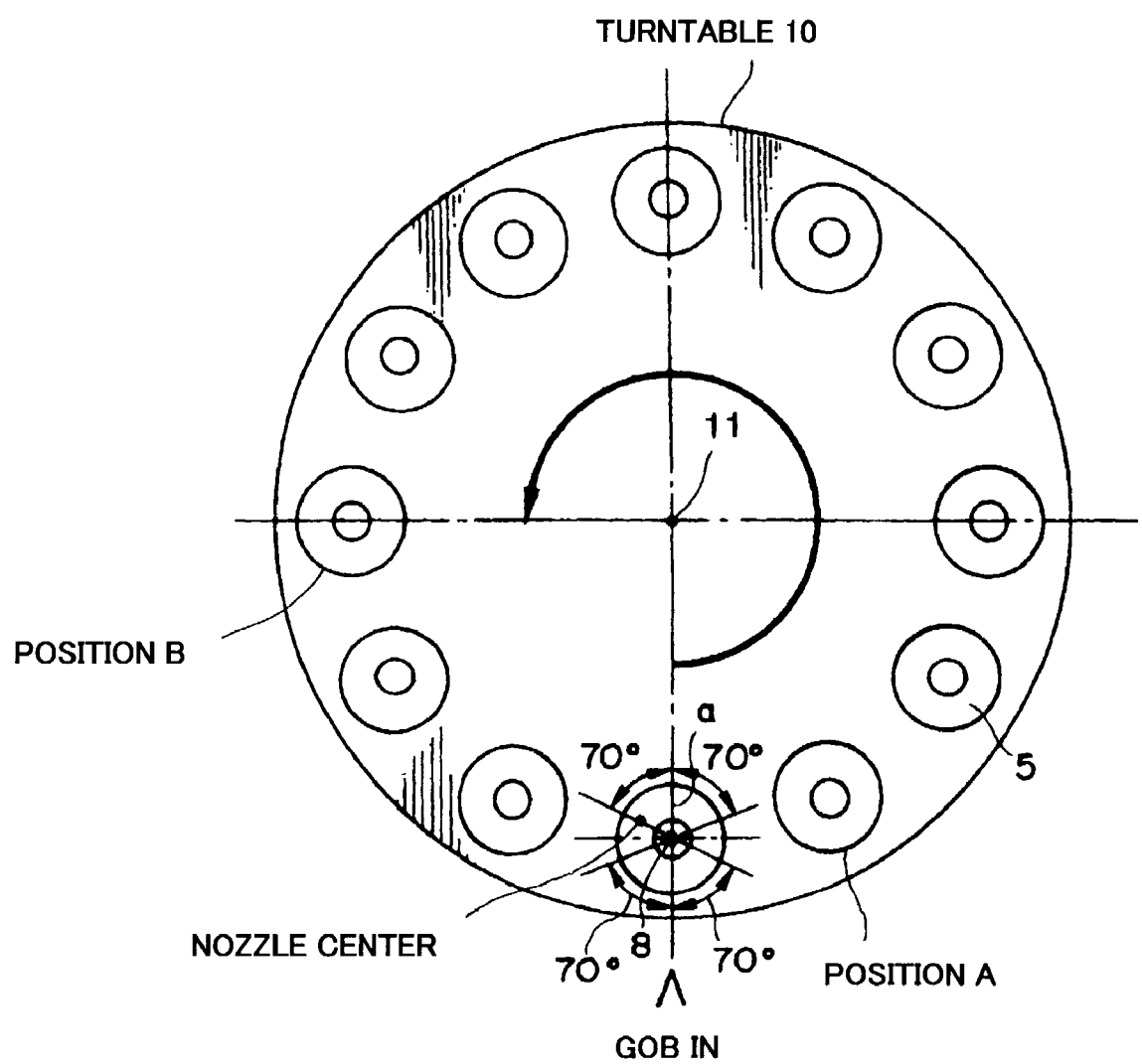
FIG. 3 is an enlarged view of the turntable of the glass preform manufacturing device of the present invention.

FIG. 3 shows the positional relation between nozzle 1 and forming mold 5 at stopping position A.

In the manufacturing method of the present invention, the front end of the nozzle is always positioned outside the space vertically above the gas outlet. That is, the nozzle and the forming mold are set so that when receiving the melt glass flow in the receiving portion and when moving the forming mold, the front end of the nozzle is positioned outside the space vertically above the gas outlet.

The molded glass object manufacturing device of the present invention is characterized in that the distance from the rotational axis to the point on the turntable directly beneath the front end of the nozzle is either longer or shorter than the distance from the rotational axis to the planar center of the forming mold so that the front end of the nozzle is always positioned outside the space vertically above the gas outlet. A description thereof including this point is given below.

As shown in FIG. 2, nozzle 1 is positioned vertically above outer rim portion 6. The position of nozzle 1 is fixed and the path of displacement of forming mold 5 is set so that when forming mold 5 is moved by rotation of the turntable to and from stopping position A, the front end of the nozzle crosses through the space vertically above gas outlet 8 of forming mold 5 without being struck by gas blown from the front end of the nozzle. In the present mode, since gas outlet 8 is positioned in the center of forming mold 5 as shown in FIG. 3, it follows the path of the center of forming mold 5 when rotated by the turntable. Further, since errors in temperature measurement occur when gas is also blown onto thermocouple 4 monitoring the temperature of nozzle 1, temperature sensors such as the thermocouple are desirably positioned on the opposite side of the path of the gas outlet from the nozzle.

In the present mode, to position the front end of the nozzle outside the space vertically above the gas outlet, nozzle 1 is desirably positioned within an area less than or equal to 70° to either side of a straight line drawn between rotational axis 11 of the turntable and gas outlet 8, with gas outlet 8 in the center, at stopping position A in FIG. 3 (the casting position at which the glass melt is received by the forming mold) above outer rim portion 6, which is the receiving portion of forming mold 5. This area less than or equal to 70° on either side may be on the turntable rotational axis 11 side of the path traced by gas outlet 8 (when the distance between the turntable rotational axis and nozzle 1 is shorter than the distance between the rotational axis and the gas outlet), or may lie outside the path traced by gas outlet 8 (when the distance between the turntable rotational axis and nozzle 1 is longer than the distance between the rotational axis and the gas outlet). The angle less than or equal to 70° on either side is desirably 20 to 60°, more preferably 30 to 50°, on either side of straight line a.

To prevent glass 9 that has slid into hollow 7 from outer rim portion 6 from jumping and adhering to the front end of nozzle 1 due to the blowing force of the gas, it is further desirable for nozzle 1 to be positioned above (at the position indicated as the center of the nozzle in FIG. 1) outer rim portion 6 on the side opposite the direction of rotation of turntable 10 on a line drawn between turntable rotational axis 11 and gas outlet 8, with gas outlet 8 in the center.

Positioning the nozzle in this manner ensures that no quantity of gas large enough to change the temperature sufficiently to affect the flow of glass melt is blown onto nozzle 1, particularly the front end of the nozzle, thereby maintaining nozzle 1 at a constant temperature, stabilizing the flow speed of the glass melt, and stabilizing the weight of the preforms. Further, since essentially no gas is blown onto the glass melt flow, the glass melt is not altered.

In the above-described mode, the example of moving the forming mold by means of a turntable has been described. However the mode of displacement is not limited thereto. For example, when forming molds arranged in a straight line are sequentially moved to the casting position and receive glass melt on the outer rim portions thereof at the casting position, shifting the nozzle position from above the path of the gas outlet 8 permits the production of good quality, stable-weight preforms (glass gobs). The glass gobs are not limited to preforms for use in precision press molding; glass elements for press molding followed by grinding or polishing may also be formed.

In the above-described mode, the example of a forming mold that forms a preform and has a trumpet-shaped hollow in the bottom of which is provided a single gas outlet has been described. However, the forming mold is not limited thereto. Forming molds having multiple gas outlets consisting of fine holes, forming molds in which hollows are formed in a porous material with the gas being blown through the porous material, and the like may also be employed.

Figure 4:
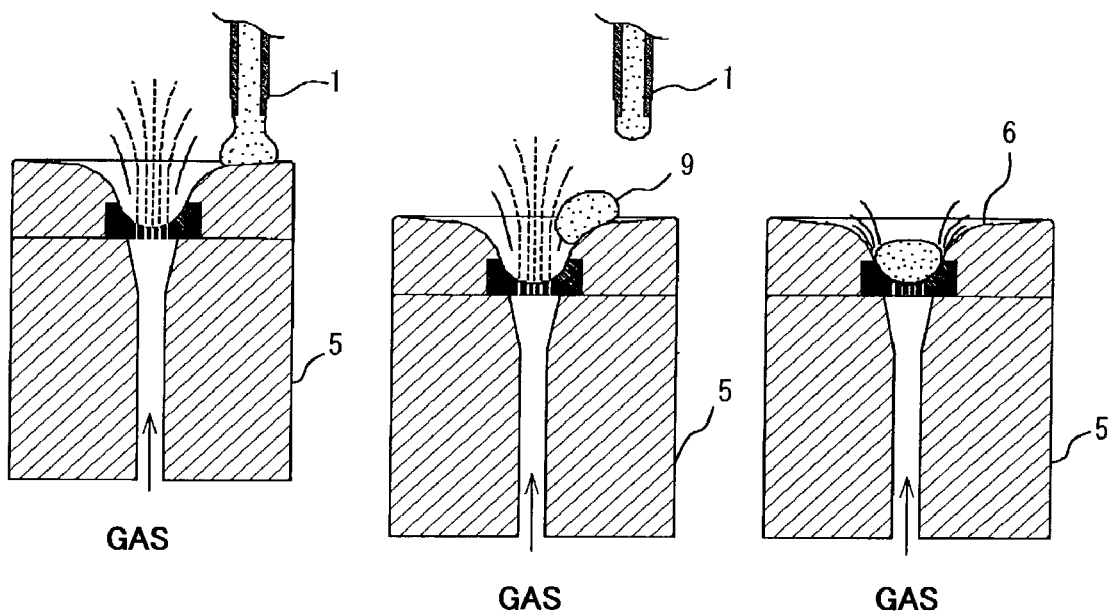
FIG. 4 is a model diagram of the method of shaping glass melt in a forming mold comprised of gas outlets in the form of multiple small tubes positioned in the bottom of a hollow.
Figure 5:
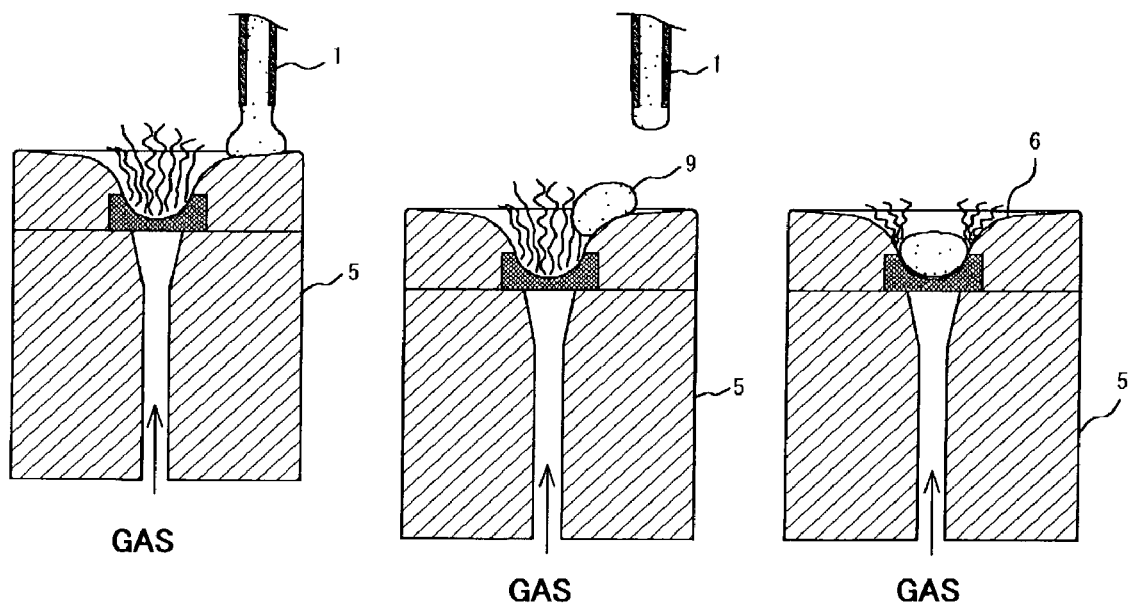
FIG. 5 is a model diagram of the method of forming glass melt in a forming mold comprised of gas outlets in the form of a porous material positioned in the bottom of a hollow.

That is, as shown in FIGS. 1 to 3, the gas outlet provided in the bottom of the hollow is the outlet (opening) of a gas feed pipe. However, as shown in FIGS. 4 and 5, the gas outlet provided in the bottom of the hollow may consist of multiple fine tubes (FIG. 4) or a porous material (FIG. 5). Thus, regardless of whether the front end of the nozzle is positioned to the outside of the space vertically above a gas outlet formed of multiple fine tubes, or of a porous material, the effect of the present invention is achieved.

Following forming, a preform (glass gob) that has been annealed and cooled to room temperature may be employed in the manufacture of a press molded article as needed. During press molding, the preform (glass gob) is heated, softened, and then press molded in a nitrogen atmosphere in a press forming mold having an upper mold and a lower mold. In this pressing, the preform is made into a precision press molded article to which the shape of the molding surfaces of the press forming mold has been precisely transferred. For example, precision press molding employing a press forming mold precisely machined to the reverse of the shape of an aspherical lens may be used to produce a desired aspherical lens without grinding or polishing of the aspherical surface.

In this manner, in addition to aspherical lenses, it is possible to produce spherical lenses, diffraction gratings, mirrors, prisms, filters, optical substrates, and various other optical elements by precision press molding.

[EXAMPLES]

Examples of the present invention are described below.

Spherical preforms were formed with the device shown in FIGS. 1 and 2. The set weight of the preforms, the number of preforms formed per minute (DPM (units/minute)), the variation in weight of the preforms formed, and the specified weight tolerances are given in Table 1. For comparison, the nozzle was positioned over the path of the gas outlet and over the outer rim portion, and preforms were formed. The results for this comparative example are also given in Table 1. $SiO_2$—$B_2O_3$—BaO optical glass was employed in Examples 1 and 5 and in the comparative example, and $B_2O$—$La_2O_5$ optical glass was employed in Examples 2 and 3 to form preforms.

As will be clear from an examination of Table 1, the examples all exhibited low weight variation and were within specifications. In contrast to the examples, in which it was possible to produce good preforms with good production properties, weight variation was significant and defects were observed in the comparative example.

The annealed preforms obtained in the examples were heated, softened, and molded in a nitrogen gas atmosphere in a precision press comprising upper and lower molds to produce aspherical lenses. The shape precision of the lenses obtained was stable.

In the present examples, the dropping method was employed and glass of prescribed weight was received in the forming mold. However, the distance between the forming mold and the nozzle can be maintained constant, a constriction can be formed in the glass melt flow, and without cutting with a blade, a prescribed weight of glass can be received in the forming mold in such a manner that the glass melt flow separates at the constriction. It is further possible to form preforms with little weight variation by a method in which preforms are molded while subjecting the glass to pressure by blowing gas.

TABLE 1

|  | Exam. 1 | Exam. 2 | Exam. 3 | Exam. 4 | Exam. 5 | Comp. Ex. |
| --- | --- | --- | --- | --- | --- | --- |
| Set weight a (mg) | 253.6 | 335.0 | 275.0 | 480.0 | 235.0 | 240.0 |
| Production rate b (units/min) | 24 | 19 | 30 | 29 | 26 | 15 |
| Cutting time (sec) | 2.50 | 3.11 | 2.01 | 2.06 | 2.35 | 4.12 |
| Weight variation c (mg) | 5.9 | 8.2 | 12.1 | 7.3 | 2.8 | 21.2 |
| Sample number d (units) | 50 | 50 | 50 | 50 | 12 | 50 |
| c/a (%) | 2.33 | 2.45 | 4.40 | 1.52 | 1.19 | 8.83 |
| Specified tolerance (mg) | 5 | 5 | 7 | 10 | 5 | 10 |
| Whether within specified weight | Yes | Yes | Yes | Yes | Yes | No |
| Presence of defects | No | No | No | No | No | Yes |

(Note)
Weight variation c gives the weight variation of a sample number d as a range.

The present invention provides a method of, and a device for, manufacturing molded glass objects with little weight variation and with good production properties.

The present invention permits the stable manufacturing of press molded articles of high shape manifestation using preforms with little weight variation.

The present disclosure relates to the subject matter contained in Japanese Patent Application No. 2001-286274 filed on Sep. 20, 2001, which is expressly incorporated herein by reference in its entirety.

What is claimed is:

1. A method of manufacturing a molded glass object which comprises:
   causing a glass melt to flow from the front end portion of a nozzle,
   receiving a prescribed weight of the glass melt flowing out by a glass melt receiving portion provided on a forming mold moved beneath the nozzle, wherein multiple forming molds are sequentially moved beneath the nozzle, including vertically separating said forming mold away from said nozzle during said glass melt flowing out of said nozzle and upon said glass melt being received by said glass melt receiving portion,
   moving the glass melt from the glass melt receiving portion to a hollow provided on said forming mold, and
   forming, in the hollow, a molded glass object while blowing gas upward through a gas outlet provided in the bottom of the hollow, such that the front end of said nozzle is constantly positioned outside the space vertically above said gas outlet.

2. The method of manufacturing a molded glass object according to claim 1, wherein said nozzle comprises a front end portion and a main body with a diameter larger than said front end portion, and positioning said main body so as to be constantly positioned outside the space vertically above said gas outlet.

3. The method of manufacturing a molded glass object according to claim 1, which comprises positioning said multiple forming molds along the perimeter centered about the rotational axis of said a turntable, displacing said forming molds by rotating said turntable in an indexed fashion, and setting the distance from the rotational axis to a point directly below the front end portion of the nozzle so as to be either greater than or less than the distance from said rotational axis to the planar center of said forming mold, thereby constantly maintaining the end portion of the nozzle at a position outside the space vertically above said gas outlet.

4. The method of manufacturing a molded glass object according to claim 1, wherein said glass melt receiving portion is an inclined portion positioned between the upper surface and hollow of said forming mold, and sliding the glass melt gob received on said inclined portion slides into said hollow of its own weight.

5. A method of manufacturing press molded articles of glass characterized in that a molded glass object manufactured by the method according to claim 1 is heated, softened, and press molded.

6. A method of manufacturing a press molded article of glass as recited in claim 5, wherein said press molded article is an optical glass elements, and said element is precision press molded.

7. The method of manufacturing a molded glass object according to claim 1,
wherein said step of sequentially moving multiple forming molds beneath the nozzle is performed by rotating a turntable containing said multiple forming molds about a rotational axis, and
wherein said nozzle is positioned within an area less than or equal to 70° to either side of a straight line drawn between the rotational axis of the turntable and the gas outlet, with the gas outlet in the center of a stopping position above an outer rim portion which is the receiving portion of each forming mold.

8. The method of manufacturing a molded glass object according to claim 7, wherein said area is on a turntable rotation axis side of a path traced by the gas outlet.

9. The method of manufacturing a molded glass object according to claim 7, wherein said area lies outside of a path traced by the gas outlet.

10. The method of manufacturing a molded glass object according to claim 7, wherein the angle less than or equal to 70° is within a range of 20°–60°.

11. The method of manufacturing a molded glass object according to claim 10, wherein the angle less than or equal to 70° is within a range of 30°–50°.

12. The method of manufacturing a molded glass object according to claim 7, wherein the nozzle is positioned at the outer rim of each said forming mold on a side opposite the direction of rotation of the turntable and on a line drawn between the turntable rotational axis and the gas outlet with the gas outlet in said center.

13. The method of manufacturing a molded glass object according to claim 1, wherein said forming molds are moved beneath the nozzle along a path such that the front end portion of the nozzle is not struck by gas blown from the gas outlet.

* * * * *